United States Patent [19]
Schmidt

[11] Patent Number: 6,145,708
[45] Date of Patent: Nov. 14, 2000

[54] LOW VOLUME FLOWABLE SOLIDS DISTRIBUTOR

[75] Inventor: Edward Lawrence Schmidt, Cincinnati, Ohio

[73] Assignee: Procter & Gamble, Cincinnati, Ohio

[21] Appl. No.: 09/027,657

[22] Filed: Feb. 23, 1998

[51] Int. Cl.[7] ............................................. A45D 24/22
[52] U.S. Cl. ..................... 222/196; 222/564; 239/500; 239/512; 239/522; 239/659; 193/29; 198/525; 198/445; 209/661
[58] Field of Search ................................... 222/196, 200, 222/547, 564, 459; 239/500, 512, 513, 522, 650, 659; 198/525, 445, 446, 452, 771; 193/29, 14, 2 R, 33, 34; 209/661, 662, 676, 679

[56] References Cited

U.S. PATENT DOCUMENTS

| | | |
|---|---|---|
| 117,718 | 8/1871 | Arey . |
| 832,400 | 10/1906 | Lyons ........................................ 222/459 |
| 874,570 | 12/1907 | Cairncross . |
| 1,385,254 | 7/1921 | Luft ........................................... 222/459 |
| 2,161,342 | 6/1939 | Francis ...................................... 221/120 |
| 2,183,274 | 12/1939 | Barnsdale .................................... 34/34 |
| 2,187,717 | 1/1940 | Weyandt .................................. 198/220 |
| 2,192,041 | 2/1940 | Headland .................................. 99/204 |
| 2,568,332 | 9/1951 | Genovese .................................... 222/56 |
| 2,577,315 | 12/1951 | Ellerbeck .................................. 222/135 |
| 2,610,726 | 9/1952 | Howard ..................................... 198/62 |
| 2,787,208 | 4/1957 | Russell ...................................... 99/235 |
| 2,792,030 | 5/1957 | Wahl ........................................ 141/145 |

(List continued on next page.)

FOREIGN PATENT DOCUMENTS

| | | |
|---|---|---|
| 498152 | 1/1951 | Belgium . |
| 26190 | 11/1953 | Finland . |
| 2289102 | 10/1974 | France ............................ A01C 15/00 |
| 1127650 | 4/1962 | Germany . |
| 2841406 | 4/1979 | Germany . |
| 0045385 | 2/1990 | Japan ..................................... 222/196 |
| 129504 | 2/1987 | Russian Federation ................ 222/200 |
| 272132 | 1/1967 | U.S.S.R. ......................... B65G 65/30 |
| 1547663 | 6/1979 | United Kingdom ........... B65G 47/19 |

OTHER PUBLICATIONS

Brouchures—"The Equiliz=R Salt and Seasoning Dispenser", Fedco Systems Co., Copyright 1997, Patent No. 4,529,107; "Vibratory Feeder Model VF–32–CA"; Fedco Systems Co.

"ARBO Medium and High Capacity Volumetric and Gravimetric Vibratory Tray Feeders", Arbo Engineering Inc., Second Edition Sep. 1996; "ARBO The KDA–VV/80 Vibratory Tray Volumetric and Gravimetric Feeder Family", Arbo Engineering, Inc.

(List continued on next page.)

*Primary Examiner*—Andres Kashnikow
*Assistant Examiner*—Dinh Q. Nguyen
*Attorney, Agent, or Firm*—Paul M. Ulrich

[57] ABSTRACT

A flowable particulate distributor is provided having at least one wall and a multiplicity of posts. Each of the posts have a first end and a second end. The posts are attached at the first ends to the at least one wall forming a geometric array such that the second ends of the posts extend away from the at least one wall. An inlet port is also provided. The inlet port is connected to the at least one wall and is positioned above the geometric array. The flowable particulate distributor can be attached to a vibratory feeder assembly. The vibratory feeder assembly includes an elongated feed tray and a vibrator. The feed tray contains the flowable solids and has an open end thereon. The vibrator is mounted on the feed tray opposite the open end and the open end is aligned with the inlet port. This invention can also be described as a method for dispensing flowable solids. This method includes the step of introducing a high density of flowable solids into a flowable particulate distributor. Preferably, the flowable solids are introduced into the flowable particulate distributor through a vibratory feeder assembly. Another step is colliding the flowable solids with the multiplicity of posts that are arranged in the geometric array. The last step can be discharging a low density dispersion of flowable solids from the flowable particulate distributor.

23 Claims, 7 Drawing Sheets

U.S. PATENT DOCUMENTS

| | | | |
|---|---|---|---|
| 2,799,242 | 7/1957 | Cain | 118/24 |
| 3,012,697 | 12/1961 | Rouse, Jr. et al. | 222/181 |
| 3,152,010 | 10/1964 | Case | 118/24 |
| 3,606,103 | 9/1971 | Taylor | 222/478 |
| 3,608,474 | 9/1971 | Liepa | 99/353 |
| 3,610,201 | 10/1971 | Meyer | 118/24 |
| 3,616,973 | 11/1971 | Hartley | 222/330 |
| 3,727,801 | 4/1973 | Caridis et al. | 222/196 |
| 4,210,074 | 7/1980 | Laughman | 99/494 |
| 4,221,306 | 9/1980 | Althoff | 222/200 |
| 4,346,802 | 8/1982 | Popper | 198/533 |
| 4,350,302 | 9/1982 | Gruber et al. | 239/500 |
| 4,419,953 | 12/1983 | Fowler | 118/16 |
| 4,471,891 | 9/1984 | Musschoot | 222/199 |
| 4,497,244 | 2/1985 | Koppens | 99/494 |
| 4,498,635 | 2/1985 | Fielding | 241/94 |
| 4,529,107 | 7/1985 | Morine et al. | 222/314 |
| 4,741,460 | 5/1988 | Blain et al. | 222/55 |
| 4,769,247 | 9/1988 | Rothenberg et al. | 426/291 |
| 4,776,493 | 10/1988 | Tegel | 222/196 |
| 4,798,164 | 1/1989 | Marazzi | 138/308 |
| 4,809,880 | 3/1989 | Stein | 221/204 |
| 4,821,782 | 4/1989 | Hyer | 141/83 |
| 4,907,720 | 3/1990 | Henson et al. | 222/55 |
| 4,936,489 | 6/1990 | Blain et al. | 222/200 |
| 4,972,970 | 11/1990 | Toerner | 222/1 |
| 5,012,957 | 5/1991 | Mihail | 222/190 |
| 5,054,652 | 10/1991 | Oshima et al. | 222/1 |
| 5,095,961 | 3/1992 | Nakagawa | 141/275 |
| 5,108,012 | 4/1992 | Rosso | 222/200 |
| 5,133,270 | 7/1992 | Ledermann et al. | 111/130 |
| 5,407,102 | 4/1995 | Freudinger et al. | 222/309 |
| 5,411,171 | 5/1995 | Quirling et al. | 222/1 |
| 5,470,600 | 11/1995 | Petelle et al. | 426/237 |
| 5,549,918 | 8/1996 | Hartman et al. | 426/291 |
| 5,560,287 | 10/1996 | Petelle et al. | 99/451 |
| 5,643,361 | 7/1997 | Wadell | 118/16 |
| 5,657,902 | 8/1997 | Kraus | 222/56 |

OTHER PUBLICATIONS

"Coatronic Salter Seasoner Applicator Model Nounber SS66.5/36", Allen Ingredients Applications.

"Standard Light Capacity Models", FMC, pp. 3 and 5; "Christy Salt Dispensing Machines", Christy Machine Company.

LOW VOLUME FLOWABLE SOLIDS DISTRIBUTOR

FIELD OF THE INVENTION

The present invention relates to an apparatus and method for depositing a small volume of granular particles onto articles on a moving conveyor. More particularly, this invention relates to an apparatus for depositing small amounts of granular flavor crystals, salts, or seasonings onto oven cooked food products.

BACKGROUND OF THE INVENTION

French fried potato strips, commonly referred to as "French fries" are one of the most popular convenience foods and are served in most fast food restaurants. Most restaurants including large restaurants prefer to prepare the French fries from a frozen or chilled partially fried potato product (hereinafter par-fried) rather then go through the procedure of preparing French fries from raw potatoes. These par-fried potatoes are converted into finished French fries, that are ready to eat, by completion of the cooking process in the fast food restaurant.

Typically the cooking process involves dispensing a large bag of par-fries into a deep fryer using hot oil to finish cooking the fries. After the fries have been deep fried they are removed from the hot oil and the excess oil is drained off of the French fries. While the excess oil is being drained, salts or seasonings are typically sprinkled onto the French fries manually from a salt shaker by an employee of the restaurant. Thereafter, the fries are scooped up and placed into individual serving sized containers by the restaurant employee. One of the problems with cooking French fries in this manner is that this process is labor intensive. Another problem with cooking French fries in this manner is that it uses a large quantity of oil. Additionally, the taste and flavor of the french fries can vary depending on many factors such as, the number of cycles between changes of the hot oil, the amount of salt or seasoning the employee sprinkles onto the fries, or the duration of time the fries have been sitting after frying has been completed.

Some restaurant operators have attempted to address these problems by using oven cooking techniques. One major problem confronted by these restaurant operators is obtaining oven cooked fries which have the taste and texture of french fries cooked by frying in hot oil. Important features of French fries cooked by a deep frying process are interior moistness, crispness of the outer crust, slightly oily surface texture, and enhanced flavor or taste. However heretofore, achieving these product characteristics generally has not been possible when the food products are oven cooked. Most oven cooked products are typically tough, dry, and less lubricious than food products cooked by frying in hot oil.

All of these aforementioned problems are recognized by the consumer and, more particularly, by the fast food restaurant operators. As a result fast food restaurants seldom practice/use oven cooking techniques for preparing par-fried food products.

SUMMARY OF THE INVENTION

It is an object of the present invention to provide a method and an apparatus for finishing par-fried food products which can be flavored to suit each individual consumer by the fast food restaurant operator wherein the taste and surface texture of the food product is virtually indistinguishable from deep fried food products.

In one aspect of the present invention, a flowable particulate distributor is provided having at least one wall and a multiplicity of posts. Each of the posts have a first end and a second end. The posts are attached at the first ends to the at least one wall forming a geometric array such that the second ends of the posts extend away from the at least one wall. An inlet port is also provided. The inlet port is connected to the at least one wall and is positioned above the geometric array. Preferably, the geometric array has an apex and more preferably, the geometric array is substantially triangular. The inlet port can be moveable above the geometric array. In a preferred embodiment, the apex is aligned with the inlet port. The flowable particulate distributor can be attached to a vibratory feeder assembly. The vibratory feeder assembly includes an elongated feed tray and a vibrator. The feed tray contains the flowable solids and has an open end thereon. The vibrator is mounted on the feed tray opposite the open end and the open end is aligned with the inlet port.

In another aspect of the present invention, a granular dispensing apparatus for dispensing flowable solids is provided having a vibratory feeder assembly and a flowable particulate distributor. The vibratory feeder assembly includes an elongated feed tray and a vibrator. The feed tray contains the flowable solids and has an open end thereon. The vibrator is mounted on the feed tray opposite the open end. The vibrator feeder assembly can also include a receptacle for storing the flowable solids. The flowable particulate distributor includes an inlet port, a first wall, a second wall, and a multiplicity of posts. The second wall is spaced away from the first wall and the posts are disposed between the walls in a geometric array. Preferably, the posts are cylindrical and are mounted substantially horizontally between the walls. Each of the posts have a first end and a second end. The first ends of the posts are attached to the first wall and the second ends of the posts are attached to the second wall. The inlet port is positioned above the geometric array such that when the vibrator is actuated, the feed tray vibrates causing the flowable solids to flow over the open end and through the inlet port onto the geometric array. Preferably, the geometric array has an apex and the apex is aligned with the inlet port. Alternatively, the inlet port is moveable above the geometric array. In a preferred embodiment, the geometric array is substantially triangular.

In yet another aspect of the present invention, a method for dispensing flowable solids is provided. This method includes the step of introducing a high density of flowable solids into a flowable particulate distributor. Preferably, the flowable solids are introduced into the flowable particulate distributor through a vibratory feeder assembly. The flowable particulate distributor having at least one wall and a multiplicity of posts. Each of the posts have a first end and a second end. The posts are attached at the first ends to the at least one wall forming a geometric array such that the second ends of the posts extend away from the at least one wall. Another step is colliding the flowable solids with the multiplicity of posts that are arranged in the geometric array. Preferably, the posts are cylindrical and the geometric array is substantially triangular. The last step can be discharging a low density dispersion of flowable solids from the flowable particulate distributor.

BRIEF DESCRIPTION OF THE DRAWINGS

While the specification concludes with claims which particularly point out and distinctly claim the invention, it is believed that the present invention will be better understood from the following description taken in conjunction with the appended claims and the accompanying drawings, in which like reference numerals identify identical elements and wherein:

DETAILED DESCRIPTION OF THE INVENTION

As used herein the terms par-fried or par-fried food products refers to food products that have been subjected to at least one frying process such as deep frying, but which have not been completely cooked.

As used herein cooked refers to a procedure wherein food products are treated with heat prior to their consumption, such as, for example, by frying, baking, boiling, microwaving, heating in a toaster or toaster oven, etc. in order to convert the food product to a ready to eat form. Typically, cooking entails reducing the moisture content of the food product.

As used herein the term finished refers to a food product that has been cooked and also has been further treated by the application of edible oils or granular seasonings in order to place the food product in a flavorful and tasty ready to eat form.

Figure 1:
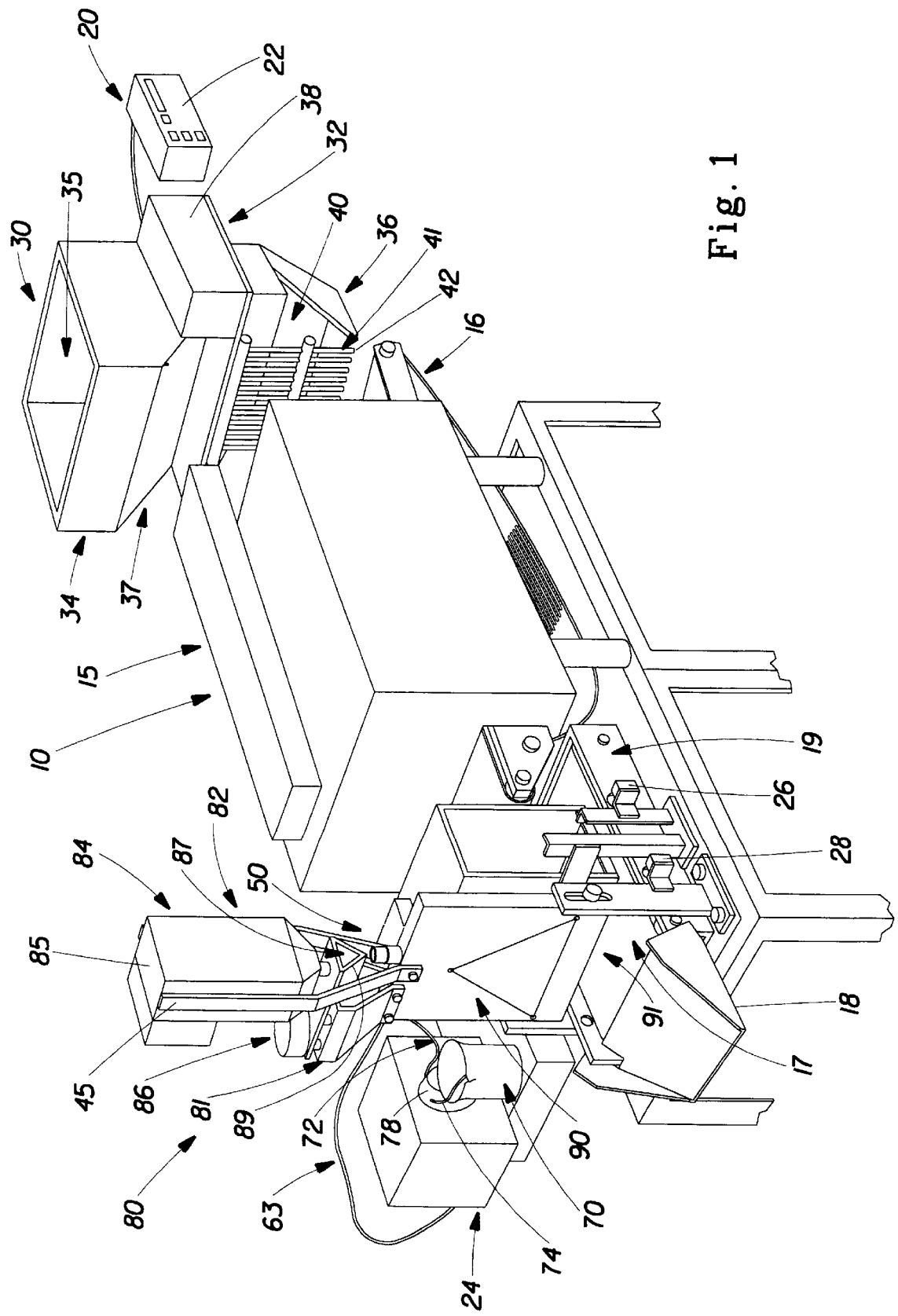
FIG. 1 is a perspective view of a preferred embodiment of the present invention.

Referring now to FIG. 1, a finishing system for a food product is shown generally indicated as 10. The finishing system 10 includes an electronic controller 20, a storage hopper 30, an oven 15, a liquid coating apparatus 50, and a granular dispensing apparatus 80. Upon actuation of the electronic controller 20, the food product is dispensed from the storage hopper 30 onto a primary conveyor 16. The food product riding on the primary conveyor 16 is then conveyed by the primary conveyor 16 from the storage hopper 30 into and through the oven 15 where the food product is cooked. From the oven 15 the food product is dropped from the primary conveyor 16 onto the secondary conveyor 17 and is then conveyed to the liquid coating apparatus 50 where the food product is coated with a liquid. Thereafter, the food product is conveyed by the secondary conveyor 17 to the granular dispensing apparatus 80 where flowable solids are applied onto the food product. Finally the secondary conveyor 17 discharges the food product into a collection tray 18 where the finished food product can be placed into a serving container. Alternatively, the primary conveyor 16 and secondary conveyor 17 can be combined into one main conveying system. After completion of these steps, the food product is finished and is in a ready to eat form.

This oven finishing system 10 is used for finishing food products that have been previously partially cooked and then frozen. The use of par-fried food products is preferred for use with this invention and have been widely adopted in fast food restaurants because of the advantages they offer. A few of the recognized advantages associated with the use of frozen par-fried food products are, for example, users know the exact costs, the number of servings and the weight per serving portion. In addition, use of frozen, par-fried food products simplifies storage and inventory control, insures uniform quality from one season to another, and reduces labor and preparation time for serving. A wide variety of par-fried or frozen food products such as chicken, fish, onion rings, french fries, vegetables, pies, and the like, can be used with this oven finishing system 10.

In practicing a preferred embodiment of the present invention, it is preferred that par-fried french fries (par-fries) be made from potato strips known in the art as shoe strings. Shoe string potato strips as used herein refers to potato strips that are from about 3/16 to about 5/16 inches in cross section and from about 2.5 to about 5 inches in length. Frozen commercial shoe string par-fried potato strips can be supplied by J. R. Simplot Co., Caldwell, ID, under the tradename SIMPLOT PAR-FRIES. Other potato strips which may be used herein are known in the art as crinkle cut strips. Such strips usually average from about 5/16 to about 1/2 inches in cross-section and from about 2 to about 4 inches in length. Also, straight potato strips (known as regular cut) being from about 5/16 to about 1/2 inches in cross-section and about 2.5 to about 5 inches in length may be used. Larger potato strips of the type referred to as steak fries may also be used. Typically steak fries have a rectangular cross-section of about 1/2 inches to about 7/8 inches. These potato strips can be coated with, for example, gelatins, gums, or starches.

A process is provided for finishing the par-fried food product so that it is ready to be eaten immediately upon finishing. Immediately as used in this context means while the food product is still in a heated condition. This process includes the following steps: Actuating the electronic controller 20 which thereafter automatically initiates the remaining steps of the finishing process and which renders this process fully automated in that no further human interaction is not required. Dispensing a predetermined quantity of par-fried food product from a storage hopper 30 onto a conveyor. Conveying the food product continuously through the remaining stages of preparation. Heating the food product in an air impingement oven 15 until the food product is cooked. Applying a light coat of liquid such as a vegetable oil onto the food product. Placing a small amount of flowable solids such as a granular seasoning onto the food product. Thereafter, discharging the food product into or through a collection tray 18. Preferably, the food product is continuously conveyed through all of the steps in this finishing process in less than about 15 minutes, more preferably in less than about 10 minutes, even more preferably in between about 3 to 5 minutes, and most preferably in between about 4 to 4.5 minutes. In particular, the total moisture content of the food product, after being subjected to this finishing process, is preferably greater than about 10%, and more preferably greater than about 30%, and even more preferably between about 25% to about 65% total moisture.

The Electronic Controller

Referring again to FIG. 1, an electronic controller 20 is used to activate, control, and monitor the entire oven finishing system 10. This electronic controller 20 can initiate, and thereafter automatically maintain, the entire finishing process which prepares the food product for consumption. Preferably the electronic controller 20 is electrically connected to a standard fast food restaurant cash register. This will enable the oven finishing system 10 to begin a fully automated finishing process immediately upon receipt of an order for a particular food product from a consumer. For example, when an employee presses the cash register keys for a large order of french fries, or even multiple orders of varying sizes, the electronic controller 20 receives this signal and is programmed to initiate the finishing process for the exact orders and sizes that have been specified by the cash register. Thus, the electronic controller 20 reduces the time and labor needed to begin finishing of the food product. Additionally, since each order is processed immediately upon receipt, the food product will be freshly finished and consequently have a fresher taste.

A preferred electronic controller 20 is programmable and has a display panel 22 for input and monitoring of ongoing operations. The electronic controller 20 can include a processor (not shown) readily available from Control Microsystems under the tradename SCADAPack and also a display panel 22 readily available from AFE Technologies, Inc., under the tradename Data Panel 320T.

The Storage Hopper

As shown in FIG. 1, the storage hopper 30 includes a metering mechanism 32, storage bin 34, and a discharge chute 36. The metering mechanism 32 is located at the bottom of the storage bin 34. Preferably, the metering mechanism 32 includes an electronic measuring device 38. An electronic measuring device 38 that can be used with this metering mechanism 32 is readily available from Mettler Toledo, Inc. under the tradename PANTHER. The electronic measuring device 38 accurately weighs the food product so that the metering mechanism 32 dispenses the correct amount of food product through the discharge chute 36. A predetermined weight of the food product is dispensed based on the electronic signal received from the electronic controller 20. Alternatively, the metering mechanism 32 can be in the form of cups or cleats of a predetermined size affixed to a rotating spindle, indexing platform, or other device which is capable of accurately metering the food product through the discharge chute 36.

Figure 2:
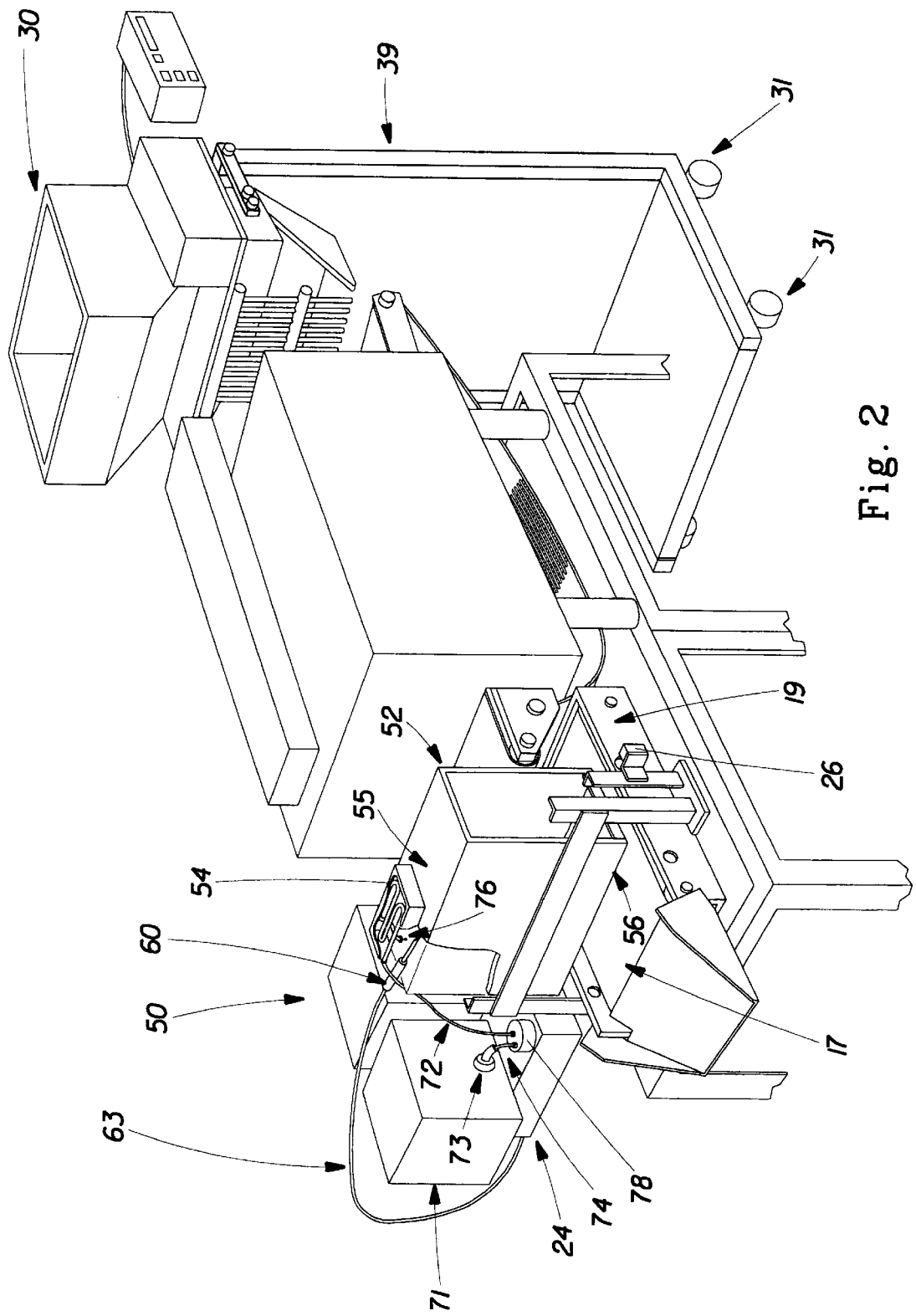
FIG. 2 is a perspective view of an alternative embodiment of the present invention, with the granular dispensing apparatus removed for clarity.
Figure 3:
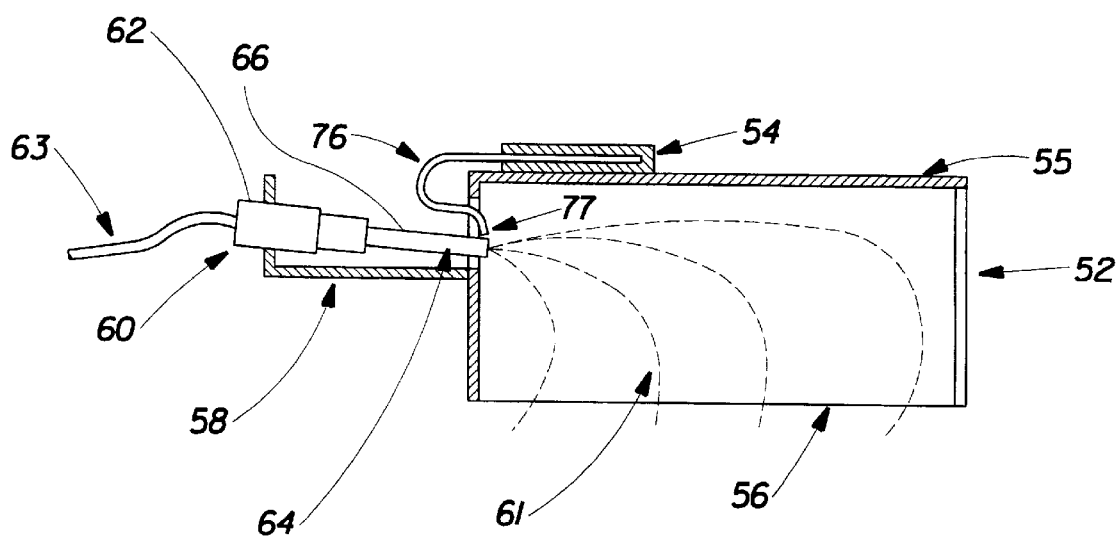
FIG. 3 is a sectional view of a preferred embodiment of the liquid coating apparatus.

Preferably, the storage bin 34 is sized to contain a large bag of par-fries, more preferably about a 36 lb. case of par-fries, or a similar weight of other food product. As shown in FIG. 1, the storage bin 34 has an open top 35 with a somewhat tapered side wall configuration 37 which allows the food product to be manually dumped into the open top 35 and then gravity forces the food product to flow downward toward the metering mechanism 32. In order to allow ease of use of this storage hopper 30, a support frame 39, as shown in FIG. 2, is provided. The support frame 39 includes wheels 31 that enable the storage hopper 30 to be easily moved from one location to another. Additionally, the support frame 39 is configured such that the storage bin 34 can be raised and lowered. This allows easy access to the open top 35 of the storage bin 34 for cleaning and to pour additional food product into the storage bin 34. A hand truck such as a GENIE LIFT can be used as the support frame 39 for the storage hopper 30.

The discharge chute 36 on the storage hopper 30 is positioned below the metering mechanism 32 in order to receive the food product from the storage bin 34 and then direct the food product onto the primary conveyor 16 or into the oven 15. The discharge chute 36 includes a channel 40 and a grate 41 positioned just above or forward of the channel 40. The grate 41 is pivotally attached to the storage hopper 30 such that the grate 41 can swing outwardly in the direction of the primary conveyor 16 movement. The grate 41 includes alignment fingers 42 that help position the food product on top of the primary conveyor 16. In particular, as the food product is discharged through the discharge chute 36, the food product pushes against the alignment fingers 42 of the grate 41 in a manner that allows the grate 41 to urge the food product to lay flat against the primary conveyor 16 in order for the food product to ride on the primary conveyor 16 in a single layer.

The Oven

Many types of ovens can be used to cook par-fried food products. In particular, the advantages of this invention can be readily realized when the food products are cooked in an oven 15 such as a forced air convection oven, a hot air impingement oven, a combination of radiation and convection oven, a combined microwave and convection oven, a toaster or toaster oven, or a conventional oven. A preferred oven 15 for use with this invention is a dual air impingement type oven such as that described in U.S. Pat. No. 4,523,391 issued to Smith et al. on Jun. 18, 1985. This oven 15 is commercially available from the Frymaster Corporation under the tradename AIR FRYER. Ovens of this type are made for commercial restaurants and include a metal wire mesh type of conveyor that transports the food product into and continuously moves the food product through the oven 15 during cooking.

For example, when frozen par-fries are prepared for consumption, such as at a retail food outlet, the par-fried potato strips are preferably cooked in an oven 15 for from about ¾ minutes to about 15 minutes, the oven 15 being at a temperature from about 325° F. to about 800° F. A preferred time for such cooking in a dual air impingement oven 15, with the par-fries arranged in a single layer on the conveyor is from about 1 minute to about 5 minutes, and more preferably from about 2 to about 2.5 minutes, at a temperature between about 350° F. to about 500° F. The time and temperature for cooking an oven finished food product can vary depending upon the quantity of food product, the initial temperature of the food product, the specific type of oven 15 and the oven conditions (temperature, air velocity) used, and the thermal properties of the food product. In general higher thermal conductivity's and higher surface heat transfer coefficients will result in a more rapid transfer of heat from the oven 15 into the food product, resulting in reduced cooking time.

The Liquid Coating Apparatus

In order to apply a light coating of liquid or vegetable oil on the food product a liquid coating apparatus 50 is utilized. Preferably the oil is applied after the food product has been cooked in a dual air impingement type oven 15. As the food product is conveyed from the oven 15 the liquid coating apparatus 50 is automatically activated by a first sensor 26 located adjacent to the secondary conveyor 17. This first sensor 26 can detect the presence of food product riding on the secondary conveyor 17 as it approaches the liquid coating apparatus 50. Alternatively, the liquid coating apparatus 50 can be integrally attached to the oven 15 or even made as an internal component of the oven 15. When french fries are the finished food product, this light coating of oil improves the texture and taste of the final finished french fries.

Referring now to FIG. 2, the liquid coating apparatus 50 includes a housing 52 positioned over the secondary conveyor 17. The housing 52 contains an ultrasonic atomizer 60 which is used to create the spray coating that is applied to the food product as the food product moves past the ultrasonic atomizer 60 on the secondary conveyor 17. The housing 52 consists of a box shaped enclosure 55 having an open bottom 56. Preferably the secondary conveyor 17 passes just under the open bottom 56 of the housing 52. Referring now to FIG.

3, the enclosure 55 also includes a mounting plate 58. The ultrasonic atomizer 60 is attached to the housing 52 by the mounting plate 58 in a position above the open bottom 56 of the enclosure 55.

As seen in FIG. 2 the ultrasonic atomizer 60 is in fluid communication with a reservoir 70 that contains a liquid. A feed tube 72 having a suction end 74 and a dispensing end 76 is used to connect the reservoir 70 in fluid communication to a pump 78 and then to the ultrasonic atomizer 60. In a preferred embodiment (shown in FIG. 2), a refill type container 71 or a bag-in-box type replaceable container 71 can be used to store the liquid in place of the reservoir 70. Preferably, the liquid contained in the reservoir 70 is a vegetable oil, food colorant, flavorant, flavored liquid, seasoning, or the like. Many of these liquids will include some small amount of solids or particulate matter in them, such as salt particles, flavor crystals, or the like. When french fries are used as the food product, a coating of vegetable oil and other liquid seasonings can improve the taste and texture, or even change the flavor of the final finished french fries.

A particularly preferred vegetable oil for use with this liquid coating apparatus 50 is readily available from The Procter & Gamble Company and is marketed under the tradename PRIMEX. A soy bean oil available from The Procter & Gamble Company under the tradename STERLING with a flavorant that is 0.3% by weight added natural talo flavor available from Duro Co. could also be used. Various other edible oils can be used with this invention including natural or synthetic fats and oils. The oil may be partially or completely hydrogenated or modified otherwise. Additionally non-toxic, fatty materials having property similar to triglycerides such as sucrose polyesters and Olean, from The Procter & Gamble Company, and reduced calorie fats and fat substitutes may also be used herein.

The widths of the primary conveyor 16 and secondary conveyor 17 are preferably between about 5 to 20 inches, and more preferably about 10 to 15 inches, and most preferably about 14 inches. In a preferred embodiment the primary and secondary conveyors 16, 17 have the same width. Alternatively, the primary conveyor 16 can have a width that is larger or smaller than the secondary conveyor 17 and a transition piece can be provided between the primary conveyor 16 and the secondary conveyor 17. As used herein the term conveyor can be any mechanism or article that is used to transport or move items from one location to another. For example a conveyor can be a continuously moving apparatus, an intermittently moving apparatus, or can simply be a pan that is physically moved from one location to another. Preferably, the primary conveyor 16 and secondary conveyor 17 include a belt that is made of an open metal wire mesh, such as stainless steel. This belt supports the food product. Consequently, any excess oil sprayed from the liquid coating apparatus 50 that does not adhere to the food product will pass through the secondary conveyor 17 and be collected in a catch basin 19 located under the secondary conveyor 17. Preferably this catch basin 19 is removable for easy access and cleaning.

Alternatively, a commonly known liquid coating apparatus 50 can be used with this finishing system 10. For example, a rotary atomizer as described in U.S. Pat. No. 4,521,462 issued to Smythe on Jun. 4, 1985, or an electrostatic atomizer such as that described in U.S. Pat. No. 4,925,699 issued to Fagan on May 15, 1990, or an electrostatic spraying system available from United Air Specialists, Inc. under the tradename TOTALSTAT® Cracker Spraying System, along with other commonly known atomization mechanisms can alternatively be used with this finishing system 10.

The Granular Dispensing Apparatus

In order to apply a small amount of flowable solids such as crystals, flakes, pellets, powders, solid particles, or granular seasonings such as salts, sugars, spices, flavorings, and flavor crystals onto the food product, a granular dispensing apparatus is utilized, generally indicated as 80 in FIG. 1. Preferably, the flowable solids include particles that are substantially spherical. More preferably, the flowable solids such as granular seasonings are applied after the food product is coated with a light coating of a liquid such as vegetable oil. As the food product is conveyed from the liquid coating apparatus 50 the granular dispensing apparatus 80 is automatically activated by a second sensor 28 located adjacent to the secondary conveyor 17. This second sensor 28 can detect the presence of food product on the secondary conveyor 17 as it approaches the granular dispensing apparatus 80. This granular dispensing apparatus 80 can be made integral with the oven 15 or liquid coating apparatus 50 and can alternatively be an independent component or even an internal component of the oven 15. When french fries are used as the food product, the application of salts and other granular seasonings can improve the taste or even change the flavor of the final finished french fries.

The granular dispensing apparatus 80 includes a vibratory feeder assembly 82 and a flowable particulate distributor 90, as shown in FIG. 1. This flowable particulate distributor 90 is positioned just above the secondary conveyor 17 in order for the flowable solids to be dropped or dispensed onto the food product riding on top of the secondary conveyor 17. This granular dispensing apparatus 80 provides for the distribution of a low flow or low volume distribution of flowable solids or solid particles over the width of the secondary conveyor 17. Low flow as used herein indicates a flow rate for flowable solids of less than about 1 g/s. The flowable solids are distributed in a controlled manner such that a substantially even distribution across the width of the secondary conveyor 17 is achieved.

Since the secondary conveyor 17 includes a belt that is made of an open metal wire mesh, any excess flowable solids that are dispensed from the granular dispensing apparatus 80 which does not fall onto the food product are collected in the catch basin 19 located under the secondary conveyor 17. Preferably this catch basin 19 is removable for easy access and cleaning. Alternatively, instead of a single catch basin 19 for both the liquid coating apparatus 50 and the granular dispensing apparatus 80, a separate catch basin 19 can be provided under the granular dispensing apparatus 80.

Figure 4:
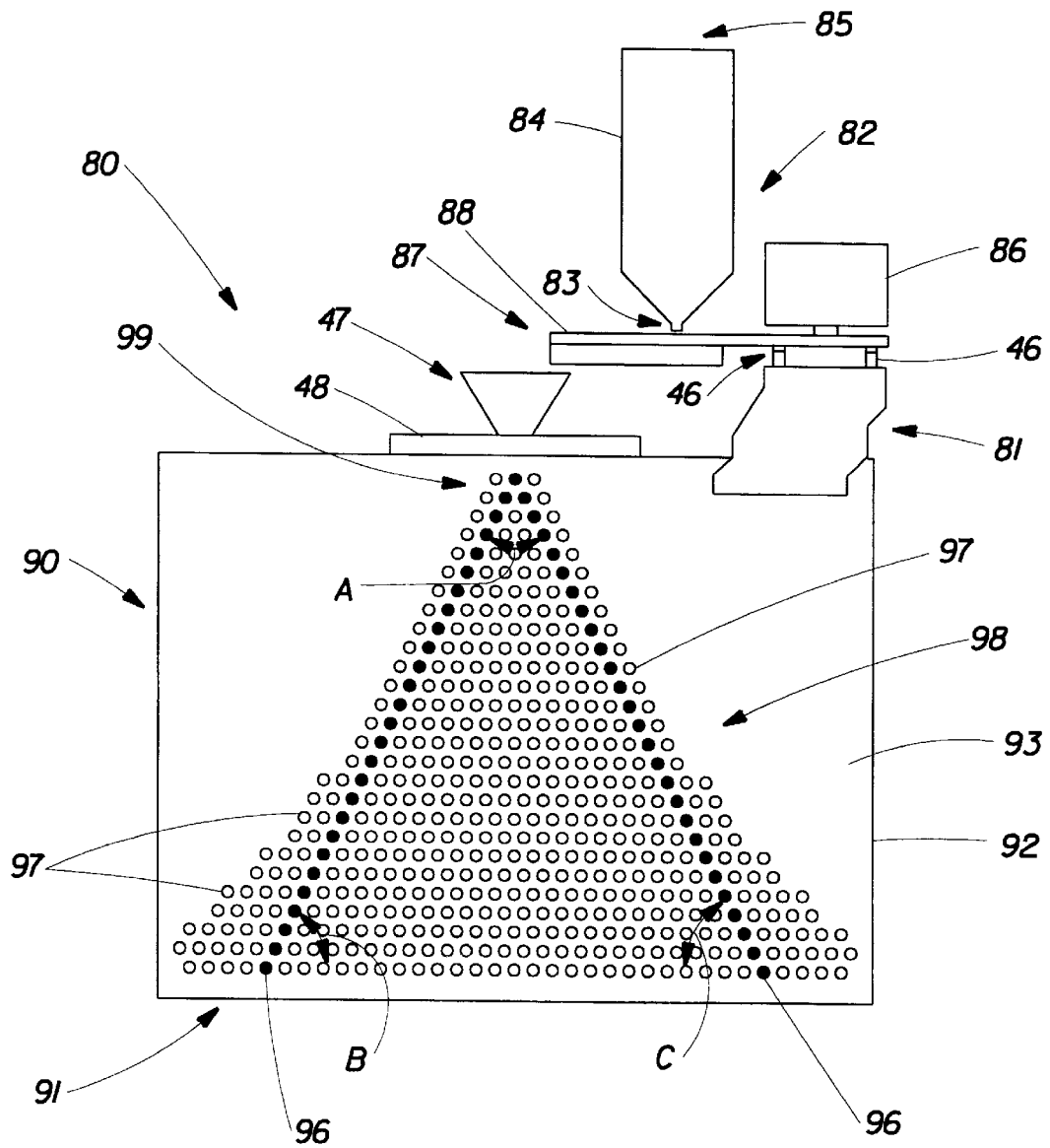
FIG. 4 is a front elevation view of the granular dispensing apparatus of the present invention, with the second wall removed and the posts shown in cross-section for clarity.

Referring now to FIG. 4, the vibratory feeder assembly 82 includes a receptacle 84, vibrator 86, and feed tray 88. A mounting bracket 81 is used to attach the vibratory feeder assembly 82 onto the flowable particulate distributor 90. The feed tray 88 has a trough 89 extending approximately the length of the feed tray 88 that terminates at an open end 87. Preferably a V-shaped or U-shaped trough 89 is used, although this feed tray 88 can be made in various shapes so long as the flowable solids are directed out through the open end 87. For example, a feed tray 88 having a semi-circular cross section, a hollow tube, rectangular trough, or the like, could be used as a feed tray 88. Mounted directly onto the feed tray 88 at the end opposite the open end 87 is a vibrator 86. When the vibrator 86 is actuated it causes the feed tray 88 to vibrate. A vibrator 86 such as one commercially available from FMC being marketed under the tradename Syntron Model V-2-B can be used. The rate of vibration or vibration amplitude can be varied by controls on the vibrator 86 or even by the electronic controller 20.

The receptacle 84 is in the form of a box having a lid 85 that can be opened and side walls that taper to an outlet 83. The outlet 83 can be in the form of a hollow tube. The receptacle 84 is attached to the flowable particulate distributor 90 by a brace 45 (shown in FIG. 1) and is positioned over the feed tray 88 so that the outlet 83 aligns with the trough 89 of the feed tray 88. The feed tray 88 and vibrator 86 are mounted on vibration dampening mounts 46 which attach the feed tray 88 to the mounting bracket 81. The receptacle 84 of the vibratory feeder assembly 82 is consequently isolated from the vibration of the feed tray 88 since those components do not come into contact with each other. The use of rubber spacers or vibration dampening mounts 46 assures vibration isolation of the receptacle 84 from the feed tray 88. This configuration enables the flowable solids contained within the trough 89 to migrate toward the open end 87 during vibration of the feed tray 88 by the vibrator 86. During use, flowable solids are placed into the receptacle 84 and the flowable solids flow from the receptacle 84 through the outlet 83 and onto the feed tray 88. The frictional effects between the feed tray 88 and the flowable solids keep the flowable solids from migrating over the open end 87 when the feed tray 88 is not being vibrated. When the vibrator 86 is actuated the flowable solids then migrate within the trough 89 of the feed tray 88 through the open end 87. The flowable solids on the feed tray 88 are replenished by the flowable solids within the receptacle 84.

Figure 5:
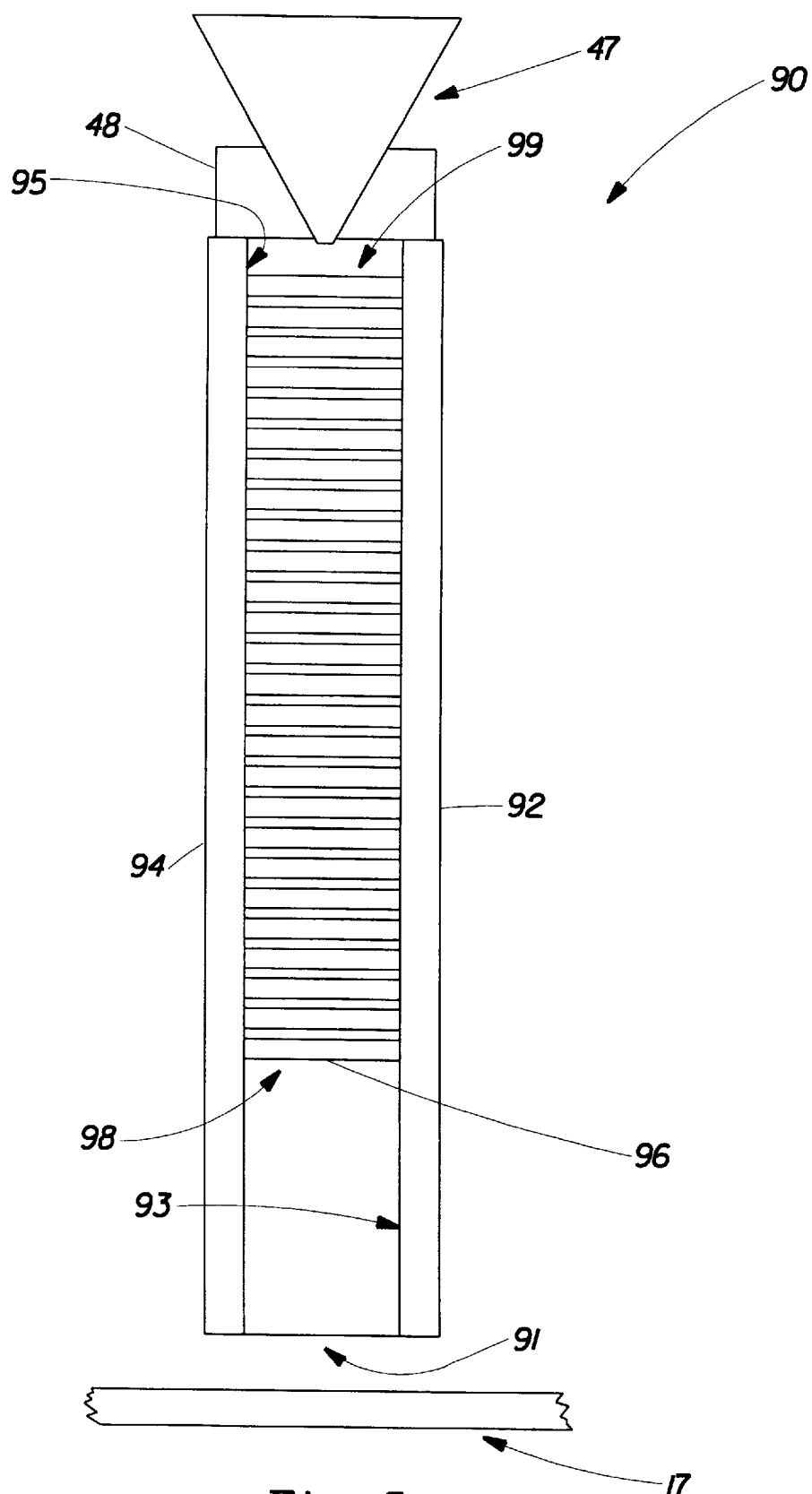
FIG. 5 is a side elevation view of the flowable particulate distributor of the present invention.

Referring now to FIG. 5, the flowable particulate distributor 90 includes at least one wall 92, 94 with a plurality of posts 96 extending therefrom. In a preferred embodiment, the flowable particulate distributor 90 includes a first wall 92 with a second wall 94 being spaced away from the first wall 92. A plurality of cylindrical posts 96 are mounted substantially horizontally between the first and second walls 92, 94. The posts 96 are disposed between the walls in a geometric array 98, indicated generally in FIG. 4 as 98. While the preferred shape of the posts 96 is cylindrical, these posts 96 can be made in a variety of cross sections and shapes such as rectangular, triangular, oval, or the like. Similarly any mixture of cross sections and shapes of posts 96 can be used in any particular geometric array 98. Each of the posts 96 have a first end and a second end. Preferably, the first end of each post is attached to the first wall 92 and the second end of each post is attached to the second wall 94.

In a preferred embodiment, the first and second walls 92, 94 have first and second surfaces 93, 95 respectively. The first and second surfaces 93, 95 are preferably substantially parallel to each other although the walls 92, 94 can alternatively be tapered to provide an incline between the first and second surfaces 93, 95. The first and second surfaces 93, 95 have a multiplicity of post holes 97 or recesses (as shown in FIG. 4) formed in them for holding the posts 96 in position. These post holes 97 can be arranged and configured such that many different geometric arrays can be formed by simply moving the posts 96 from one post hole 97 to another. The number, arrangement and size of the posts 96 and the size of the flowable particulate distributor 90 can be varied depending on the width of the secondary conveyor 17, size of flowable solids, or desired distribution pattern.

Preferably the geometric array 98 is in the form of a triangle, more preferably an isosceles triangle. Most preferably the geometric array 98 formed by the plurality of posts 96 has a pinnacle or apex 99. The apex 99 of the geometric array 98 is the upper most portion of the geometric array 98. As shown if FIG. 4, the posts 96 are arranged such that the geometric array 98 is an isosceles triangle preferably having interior angles A, B, and C wherein the angle A is at the apex 99. Preferably the angle A is between about 50° to about 70°. The angles A, B and C can be equivalent, forming an equilateral triangle, or these angles can alternatively be different from each other.

A particularly preferred embodiment of the flowable particulate distributor 90 preferably includes cylindrical posts 96 having a diameter of between about ¼ and ⅜ inches and having a length of about 1 inch. While preferred shapes and sizes of the posts 96 have been described, these posts 96 can alternatively be tapered from the first end to the second end or even have an irregular thickness. Preferably, the posts 96 are made from a metal such as aluminum, stainless steel, titanium or the like, however, the posts 96 can also be made of many other materials such as plastics, wood, composites, or the like. More preferably, the post holes 97 are positioned to provide a center-line to center-line vertical spacing between each post 96 greater than about ¼ inch, and most preferably a vertical spacing of about 3/16 inch; with a preferable center-line to center-line horizontal spacing between each post 96 greater than about ¼ inch, and more preferably a horizontal spacing of about ⅜ inches.

The flow of the particles through the flowable particulate distributor 90 can be controlled or varied by changing the shape of the geometric array 98 so long as the posts 96 are substantially perpendicular to the direction of the downward flow of the flowable solids. In particular, the flowable particulate distributor 90 can be described as a method for dispensing flowable solids which converts a high density input into a low density output. Initially, a high density of flowable solids is introduced into the flowable particulate distributor 90. These flowable solids collide with the multiplicity of posts 96 in the geometric array 98. Then the flowable solids are discharged from the flowable particulate distributor 90 in a low density dispersion. As used herein, the high density is greater than the low density by a factor identified as a density ratio. This density ratio indicates that the density, measured as mass per unit area, of the flowable solids entering the flowable particulate distributor 90 is greater than about 20 times that of the flowable solids exiting the flowable particulate distributor 90. More preferably, this density ratio is greater than about 100, and most preferably is greater than about 200. When salts are used as the flowable solids, the high density is preferably between about 0.05 to about 10 g/cm$^2$, and more preferably about 3 g/cm$^2$; and the low density is preferably between about 2.2×10(−4) to about 4.4×10(−2) g/cm$^2$, and more preferably about 1/70 g/cm$^2$.

Additionally, the distribution pattern of flowable solids exiting the flowable particulate distributor 90 and covering the secondary conveyor 17 can be substantially uniform. However, the distribution pattern can also be adjusted so that one side, or the other, of the secondary conveyor 17 can have more or less flowable solids landing thereon. Such a change in distribution pattern can be achieved by placing varying quantities of additional posts 96 inside of the geometric array 98, outside of the geometric array 98, or to one side or the other of the apex 99 of the geometric array 98.

Figure 6:
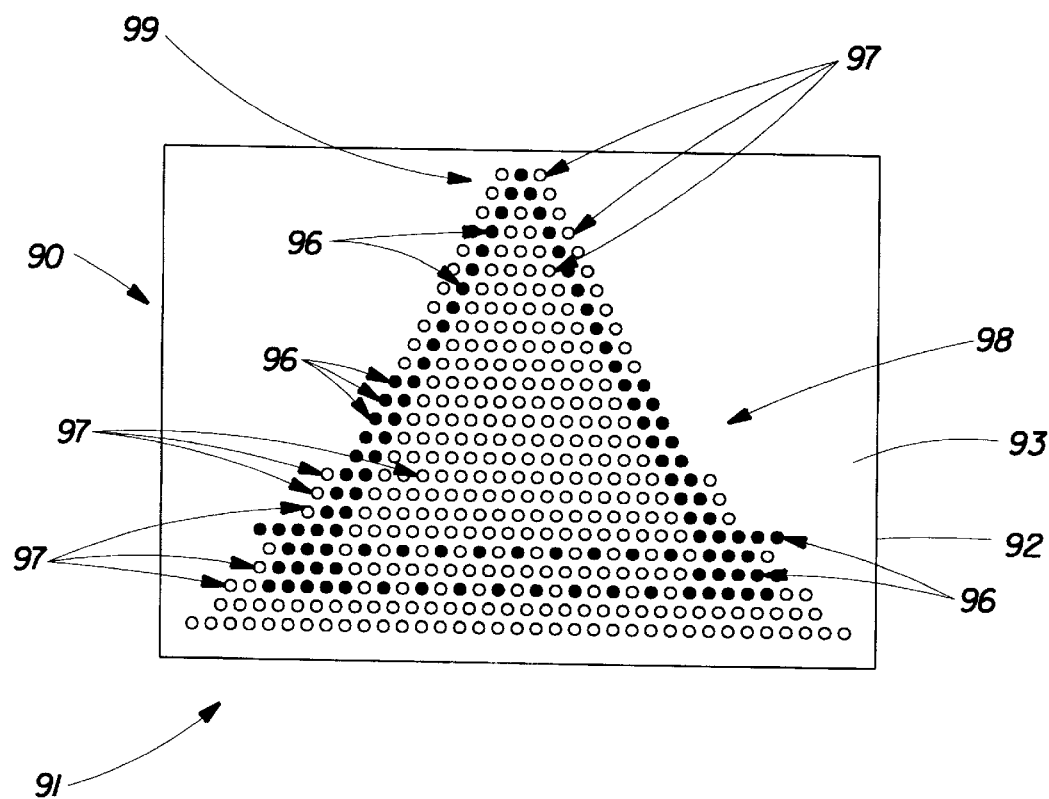
FIG. 6 is a front elevation view similar to FIG. 4 of an alternative embodiment; and, FIG. 7 is a chart of a particle distribution from use of the present invention.
Figure 7:
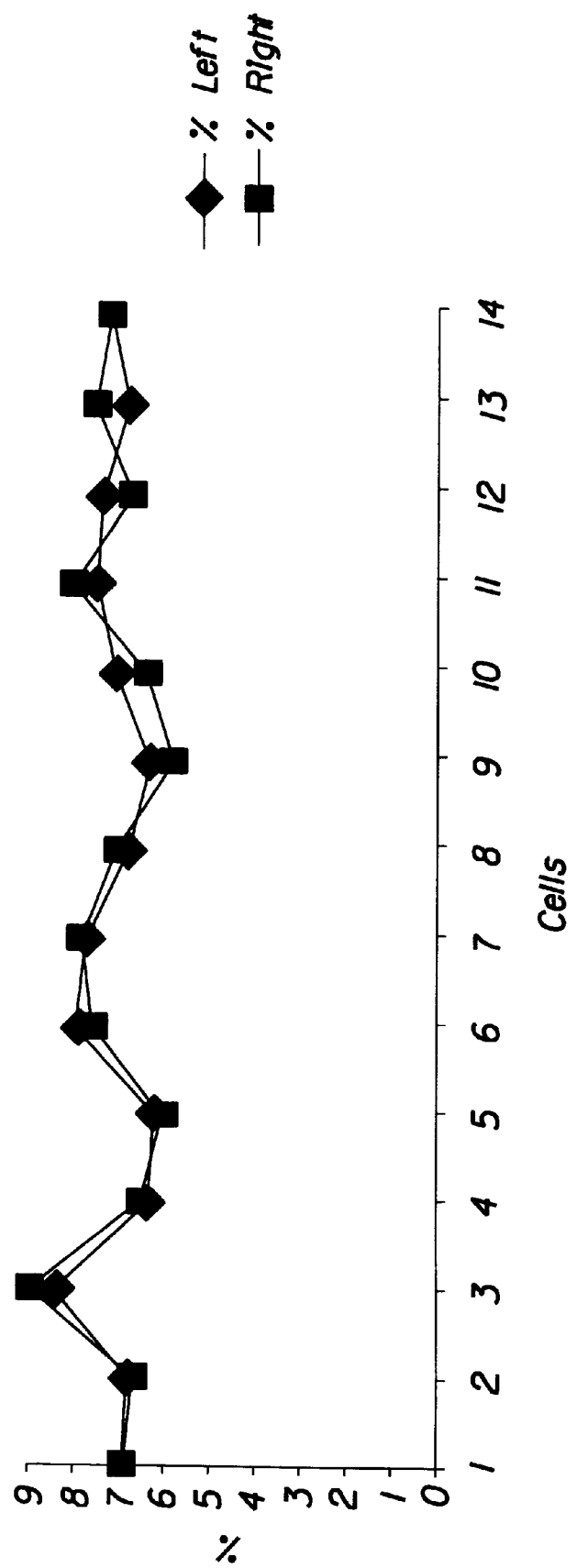

Referring now to FIG. 6, an alternative embodiment of a geometric array 98 is shown. The geometric array 98 is substantially triangular and includes posts 96 arranged inside of the geometric array 98 as well as posts 96 arranged outside of the geometric array 98. There are also posts 96 aligned along the lower end of the geometric array 98 opposite the apex 99. A flowable particulate distributor 90 using stainless steel posts 96 configured in the geometric array 98, as shown in FIG. 6, exhibits the distribution pattern shown in FIG. 7, when dispensing approximately 120 g of about 400 micron size salt particles at a flow rate of less than about 1 g/s, and more particularly at a flow rate of about 0.7 g/s. The salt used during this test of the flowable particulate distributor 90 is ordinary table salt which is commercially available from Morton International, Inc. under the tradename MORTON IODIZED SALT. In particular, the cell locations of FIG. 7 correspond to one-half inch increments across the width of a 14 inch wide secondary conveyor 17. The secondary conveyor 17 is divided into a right side and a left side. The cells numbered 14 right and 14 left are located adjacent to the center of the secondary conveyor 17 with the cell numbers decreasing toward the outer edges of the secondary conveyor 17 such that cell 1 right is at the right edge and cell 1 left is at the left edge. As salt is dispensed from the bottom opening 91 of the flowable particulate distributor 90, it is collected in each individual cell located at a distance of about 1.5 inches below the bottom opening 91. The percentage indicates a percentage of the total weight of salt collected at each cell location.

Located in a position above the apex 99 of the geometric array 98 is an inlet port 47 as seen in FIGS. 4 and 5. This inlet port 47 is preferably in the form of a funnel mounted on a moveable block 48. The moveable block 48 is provided with an aperture through which the inlet port 47 extends and at least one slotted hole through which a fastener can attach the moveable block 48 onto the top of the first or second walls 92, 94. This slotted hole allows for lateral movement of the inlet port 47 in tandem with the moveable block 48. The final distribution pattern can also be controlled by placement of the inlet port 47 to either side of the apex 99 of the geometric array 98. Preferably, the inlet port 47 is centered on the apex 99 but is moveable over a range of positions to the left and right of the apex 99 of the geometric array 98. During operation, the flowable solids are poured into the inlet port 47 from the open end 87 of the feed tray 88. The inlet port 47 then directs these flowable solids downward under the force of gravity onto the plurality of posts 96 positioned in a geometric array 98 within the flowable particulate distributor 90.

When the food product riding on the secondary conveyor 17 is at a predetermined position beneath the granular dispensing apparatus 80, an electrical signal is received by the vibrator 86 of the vibratory feeder assembly 82. This signal actuates the vibrator 86 which begins to vibrate the feed tray 88 so that the flowable solids are poured over the open end 87 of the feed tray 88 and thereby dispensed from the vibratory feeder assembly 82 into the inlet port 47 of the flowable particulate distributor 90. The flowable solids enter the flowable particulate distributor 90 through the inlet port 47 under the influence of gravity. The flowable solids then cascade downward onto the posts 96 such that the flowable solids collide, recoil, or bounce off of the posts 96 in a somewhat random fashion as the force of gravity directs the particles downward onto the food product riding on the secondary conveyor 17. The flowable solids that contact the food product adhere to the food product because the food product has been coated with a light coating of vegetable oil that was applied by the liquid coating apparatus 50.

As a result of the use of this invention, oven finished fries can be produced that are virtually indistinguishable from french fries which have been cooked using a deep frying process. For example, the oven finished french fries are golden brown in color and have a crisp crust and a moist interior. The finished french fries also have a texture, mouth yield and taste which closely resembles commercially prepared french fried potatoes that have been prepared by deep oil frying, such as at McDonalds™. Besides being advantageous from a taste, texture, and appearance standpoint, the invention disclosed herein helps to assure freshly delivered food products in flavorful variations which have been heretofore unavailable. Moreover this invention also offers an economical advantage since there is a reduction in the amount of money expended on cooking oil which is one of the major expenditures incurred by the producers of deep oil fried food products.

Analytical Test Method

Total moisture content of finished food products is determined by a forced air oven method as follows:

1. Uniformly grind up a representative sample of finished food product in a blender or conventional food processor.
2. Accurately weigh approximately 5 grams of ground sample (weight "X") into a previously tared metal pan or dish.
3. Place the metal dish containing the sample in a forced air convection oven at 105° C. for 2 hours.
4. After 2 hours, remove the metal dish containing the dried sample and allow to cool to room temperature in a desiccator over a desiccant such as anhydrous calcium sulfate.
5. Re-weigh the dish containing the dried sample and calculate the weight of the dried sample (weight "Y") by subtracting the dish tare weight.
6. Calculate the percent total moisture of the sample as follows:

% Total Moisture=$[(X-Y)/(X)]\times 100$.

Although particular embodiments as well as preferred processing steps of the present invention have been shown, disclosed, and illustrated, the functional equivalents of each can be substituted without departing from the spirit or nature of the present invention. The terms used in describing the invention are used in their descriptive sense and not as terms of limitation, it being intended that all equivalents thereof be included within the scope of the appended claims.

What is claimed is:

1. A granular dispensing apparatus for dispensing flowable solids, comprising:

a vibratory feeder assembly including an elongated feed tray and a vibrator, the feed tray contains the flowable solids and has an open end thereon, the vibrator is mounted on the feed tray opposite the open end; and, a flowable particulate distributor including an inlet port, a first wall, a second wall, and a multiplicity of posts, the second wall being spaced away from the first wall, both of said first and second walls having a plurality of post holes formed within the walls, the posts being disposed between the walls in a geometric array, each of the posts having a first end and a second end, the first ends of the posts being attached to the plurality of post holes of the first wall and the second ends of the posts being attached to the plurality of post holes of the second wall, and the inlet port being positioned above the geometric array such that when the vibrator is actuated the feed tray vibrates causing the flowable solids to flow over the open end and through the inlet port and onto the geometric array, whereby the posts can be arranged and configured such that many different geometric arrays can be formed by simply moving the posts from one of the post holes to another of the post holes.

2. The granular, dispensing apparatus for dispensing flowable solids according to claim 1 wherein the vibrator feeder assembly includes a receptacle for storing the flowable solids.

3. The granular dispensing apparatus for dispensing flowable solids according to claim 1 wherein the geometric array has an apex.

4. The granular dispensing apparatus for dispensing flowable solids according to claim 3 wherein the apex is aligned with the inlet port.

5. The granular dispensing apparatus for dispensing flowable solids according to claim 1 wherein the geometric array is substantially triangular.

6. The granular dispensing apparatus for dispensing flowable solids according to claim 1 wherein the posts are mounted substantially horizontally between the walls.

7. The granular dispensing apparatus for dispensing flowable solids according to claim 1 wherein the posts are cylindrical.

8. A flowable particulate distributor comprising:
   at least one wall;
   a multiplicity of posts, each of the posts having a first end and a second end, the posts being removably attached at the first ends to the at least one wall forming a geometric array such that the second ends of the posts extend away from the at least one wall, whereby the posts can be arranged and configured such that many different geometric arrays can be formed by simply moving the posts; and
   an inlet port, the inlet port being connected to the at least one wall and being positioned above the geometric array.

9. The flowable particulate distributor according to claim 8 wherein the at least one wall further comprises a plurality of attachment means for holding the posts in position whereby the posts can be arranged and configured such that many different geometric arrays can be formed by simply moving the posts from one of the attachment means to another of the attachment means.

10. The flowable particulate distributor according to claim 9 wherein the plurality of attachment means are post holes disposed within the at least one wall.

11. The flowable particulate distributor according to claim 8 wherein the inlet port is moveable above the geometric array.

12. The flowable particulate distributor according to claim 8 wherein the geometric array has an apex.

13. The flowable particulate distributor according to claim 12 wherein the apex is aligned with the inlet port.

14. The flowable particulate distributor according to claim 1 wherein the geometric array is substantially triangular.

15. The flowable particulate distributor according to claim 8 further comprising a vibratory feeder assembly.

16. The flowable particulate distributor according to claim 15 wherein the vibratory feeder assembly includes an elongated feed tray and a vibrator, the feed tray contains the flowable solids and has an open end thereon, the vibrator is mounted on the feed tray opposite the open end and the open end is aligned with the inlet port.

17. A method for dispensing flowable solids comprising the steps of:
   introducing a high density of flowable solids into a flowable particulate distributor having at least one wall and a multiplicity of posts, each of the posts having a first end and a second end, the posts being removably attached at the first ends to the at least one wall forming a geometric array such that the second ends of the posts extend away from the at least one wall, whereby the posts can be arranged and configured such that many different geometric arrays can be formed by simply moving the posts;
   colliding the flowable solids with a multiplicity of posts that are arranged in a geometric array; and
   discharging a low density dispersion of flowable solids from the flowable particulate distributor.

18. The method for dispensing flowable solids according to claim 17 wherein the at least one wall further comprises a plurality of attachment means for holding the posts in position whereby the posts can be arranged and configured such that many different geometric arrays can be formed by simply moving the posts from one of the attachment means to another of the attachment means.

19. The method for dispensing flowable solids according to claim 18 wherein the attachment means are post holes.

20. The method for dispensing flowable solids according to claim 17 wherein the geometric array is substantially triangular.

21. The method for dispensing flowable solids according to claim 17 wherein the posts are cylindrical.

22. The method for dispensing flowable solids according to claim 17 wherein the flowable solids are introduced into the flowable particulate distributor through a vibratory feeder assembly.

23. A granular dispensing apparatus for dispensing flowable solids, comprising:

a vibratory feeder assembly including an elongated feed tray and a vibrator, the feed tray contains the flowable solids and has an open end thereon, the vibrator is mounted on the feed tray opposite the open end; and, a flowable particulate distributor including an inlet port, a first wall, a second wall, and a multiplicity of posts, the second wall being spaced away from the first wall, the posts being disposed between the walls in a geometric array, each of the posts having a first end and a second end, the first ends of the posts being attached to the first wall and the second ends of the posts being attached to the second wall, and the inlet port being positioned above the geometric array such that when the vibrator is actuated the feed tray vibrates causing the flowable solids to flow over the open end and through the inlet port and onto the geometric array, and the inlet port is moveable above the geometric array.

* * * * *

UNITED STATES PATENT AND TRADEMARK OFFICE
CERTIFICATE OF CORRECTION

PATENT NO. : 6,145,708
DATED : November 14, 2000
INVENTOR(S) : Edward L. Schmidt It is certified that error appears in the above-identified patent and that said Letters Patent is hereby corrected as shown below:

<u>Claim 14,</u>
Line 43 and 44, please delete "claim 1" and insert therefore -- claim 8 --.

Signed and Sealed this

Sixth Day of November, 2001

Attest:

*Attesting Officer*

NICHOLAS P. GODICI
*Acting Director of the United States Patent and Trademark Office*